United States Patent
Wang et al.

(10) Patent No.: US 11,876,878 B2
(45) Date of Patent: Jan. 16, 2024

(54) DATA TRANSPORT FOR EVENT MACHINE BASED APPLICATION

(71) Applicant: NOKIA SOLUTIONS AND NETWORKS OY, Espoo (FI)

(72) Inventors: Wei Wang, Zhejiang (CN); Bing Zhang, Zhejiang (CN); Hanxiao Shen, Zhejiang (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/797,943

(22) PCT Filed: Feb. 10, 2020

(86) PCT No.: PCT/CN2020/074659
§ 371 (c)(1),
(2) Date: Aug. 5, 2022

(87) PCT Pub. No.: WO2021/159248
PCT Pub. Date: Aug. 19, 2021

(65) Prior Publication Data
US 2023/0062216 A1    Mar. 2, 2023

(51) Int. Cl.
*G06F 15/16* (2006.01)
*H04L 67/63* (2022.01)
*H04L 67/56* (2022.01)

(52) U.S. Cl.
CPC .............. *H04L 67/63* (2022.05); *H04L 67/56* (2022.05)

(58) Field of Classification Search
CPC ................................ H04L 67/63; H04L 67/56
(Continued)

(56) References Cited

U.S. PATENT DOCUMENTS 6,590,905 B1 * 7/2003 Suumaki .................. H04L 9/40
370/468
8,111,707 B2 * 2/2012 Riddle .................... H04L 69/04
711/170
(Continued)

FOREIGN PATENT DOCUMENTS

| CN | 104158627 A | 11/2014 |
|---|---|---|
| WO | 2010/142853 A1 | 12/2010 |
| WO | 2017/173098 A1 | 10/2017 |

OTHER PUBLICATIONS

International Search Report and Written Opinion dated Nov. 12, 2020 corresponding to International Patent Application No. PCT/CN2020/074659.

(Continued)

*Primary Examiner* — Alicia Baturay
(74) *Attorney, Agent, or Firm* — SQUIRE PATTON BOGGS (US) LLP

(57) ABSTRACT

Embodiments of the present disclosure relate to data transport for an event machine based application. An electronic device identifies a first higher layer protocol for processing an Ethernet frame. The electronic device extracts an ingress payload from the Ethernet frame based on the identified first higher layer protocol. In accordance with a determination that the ingress payload is associated with a plurality of services, the electronic device converts the ingress payload into a first group of events associated with the plurality of services. The electronic device provides the first group of events to an ingress queue so as to be scheduled to the plurality of services.

20 Claims, 7 Drawing Sheets

(58) Field of Classification Search
USPC .......................................................... 709/201
See application file for complete search history.

(56) References Cited

U.S. PATENT DOCUMENTS

| | | | | |
|---|---|---|---|---|
| 8,885,670 | B2* | 11/2014 | Niddam | H04W 28/06 370/477 |
| 9,384,204 | B2* | 7/2016 | Gupta | H03M 7/3079 |
| 9,854,069 | B2* | 12/2017 | Kfir | H04L 45/74 |
| 9,948,579 | B1 | 4/2018 | Sivaramakrishnan | |
| 9,967,372 | B2* | 5/2018 | Arangasamy | H04L 69/22 |
| 9,992,310 | B2* | 6/2018 | Arangasamy | H04L 12/28 |
| 10,055,134 | B2* | 8/2018 | Li | G06F 16/21 |
| 10,454,498 | B1* | 10/2019 | Mao | H03M 7/6023 |
| 10,492,100 | B2* | 11/2019 | Kwon | H04L 9/40 |
| 10,719,252 | B2* | 7/2020 | Wang | G06F 3/0608 |
| 11,019,118 | B2* | 5/2021 | Iguchi | H04N 21/242 |
| 11,038,990 | B2* | 6/2021 | Nolan | H04L 41/145 |
| 2015/0286701 | A1* | 10/2015 | Wideman | G06F 16/285 707/737 |
| 2016/0092112 | A1* | 3/2016 | Akgun | H03M 5/00 711/154 |
| 2016/0380900 | A1* | 12/2016 | Kolhi | H04L 67/568 370/235 |
| 2017/0104850 | A1 | 4/2017 | Arangasamy et al. | |
| 2019/0141167 | A1 | 5/2019 | Nolan et al. | |
| 2021/0232528 | A1* | 7/2021 | Kutch | G06F 9/45558 |
| 2021/0377366 | A1* | 12/2021 | Nolan | G06N 20/00 |

OTHER PUBLICATIONS

Extended European Search Report dated Aug. 25, 2023 corresponding to European Patent Application No. 20918207.0.

Shihao Su et al., "5G Fronthaul Design Based on Software-defined and Virtualized Radio Access Network," 2019 28th Wireless and Optical Communications Conference (WOCC), IEEE, May 9, 2019, pp. 1-5, XP033581454.

First Office Action dated Sep. 29, 2023 corresponding to Chinese Patent Application No. 202080096188.8 with English Summary thereof.

* cited by examiner

US 11,876,878 B2

DATA TRANSPORT FOR EVENT MACHINE BASED APPLICATION

FIELD

Embodiments of the present disclosure generally relate to the field of telecommunication and in particular, to an electronic device, method, apparatus and computer readable medium for data transport for an event machine based application.

BACKGROUND

A Virtual Radio Access Network (vRAN) is a radio network architecture in which the required baseband and protocol processing for one or more radio cells is performed on centralized computing resources or cloud infrastructure. In a vRAN, a Distributed Unit (DU) may be virtualized with a container infrastructure besides virtualization of a Centralized Unit (CU). Both virtualized CU (vCU) and virtualized DU (vDU) handle user plane traffic in high throughput and low latency, such as giga bits per second for realtime (RT) services.

The vCU may support user plane traffic with General Packet Radio Service (GPRS) Tunneling Protocol User Plane (GTP-U) based on Internet Protocol (IP) stack for both S1-U interface and F1-U interface. The S1-U interface is an interface between CU and Core Network (CN) for user plane traffic, and the F1-U interface is an interface between CU and DU for user plane traffic. The vDU is more complex, and may support user plane traffic with GTP-U based on IP stack for F1-U interface, Evolved Common Public Radio Interface (eCPRI) Protocol based on ether layer for fronthaul interface, and for example an intra-container BTS Internal Protocol (BIP) based on ether layer for applications based on event machine (EM). Because the vDU supports more protocols than the vCU, the transport IO solution for the vCU cannot cover all cases of the vDU. Thus, a transport IO solution is needed for the vDU with container infrastructure.

SUMMARY

In general, example embodiments of the present disclosure provide a solution for data transport for an event machine based application.

In a first aspect, there is provided an electronic device. The electronic device comprises at least one processor; and at least one memory including computer program codes; the at least one memory and the computer program codes are configured to, with the at least one processor, cause the electronic device to: identify a first higher layer protocol for processing an Ethernet frame; extract an ingress payload from the Ethernet frame based on the identified first higher layer protocol; in accordance with a determination that the ingress payload is associated with a plurality of services, convert the ingress payload into a first group of events associated with the plurality of services; and provide the first group of events to an ingress queue so as to be scheduled to the plurality of services.

In a second aspect, there is provided a method implemented on an electronic device. The method comprises: identifying a first higher layer protocol for processing an Ethernet frame; extracting an ingress payload from the Ethernet frame based on the identified first higher layer protocol; in accordance with a determination that the ingress payload is associated with a plurality of services, converting the ingress payload into a first group of events associated with the plurality of services; and providing the first group of events to an ingress queue so as to be scheduled to the plurality of services.

In a third aspect, there is provided an apparatus. The apparatus comprises: means for identifying a first higher layer protocol for processing an Ethernet frame; means for extracting an ingress payload from the Ethernet frame based on the identified first higher layer protocol; in accordance with a determination that the ingress payload is associated with a plurality of services, means for converting the ingress payload into a first group of events associated with the plurality of services; and means for providing the first group of events to an ingress queue so as to be scheduled to the plurality of services.

In a fourth aspect, there is provided a computer readable medium comprising a computer program for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
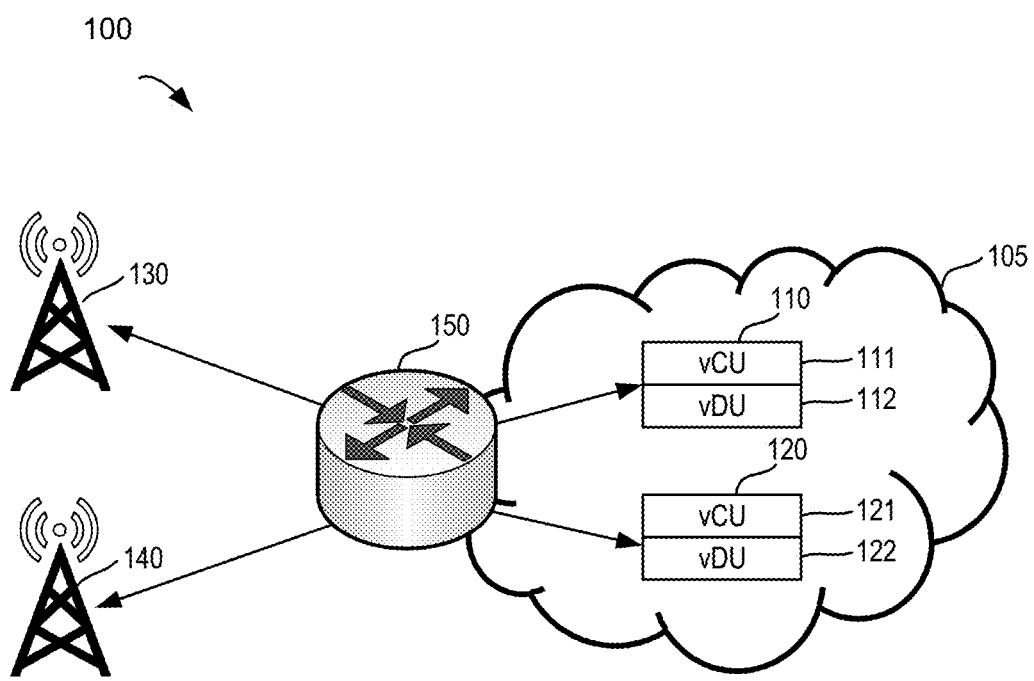
FIG. 1 illustrates an example vRAN in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), the fifth generation (5G) new radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a Radio Unit (RU), a Distributed Unit (DU), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "higher layer protocol" refers to any protocol above an Ethernet layer.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example 100 of a vRAN in which embodiments of the present disclosure can be implemented. The vRAN 100 may comprise virtual baseband units (vBBUs) 110 and 120. The vBBUs 110 and 120 may be, for example, deployed on multiple Networking Function Virtualization (NFV) platforms e.g. on industry standard x86 hardware and consolidated in a centralized data center 105. Each of the vBBUs 110 and 120 may be connected to a core network (not shown) via dedicated physical line connection such as a fiber optic cable or any other known or to be developed means for physical connection. The connection between each of the vBBUs 110 and 120 and the core network may be referred to as a backhaul connection. The backhaul connection between the vBBUs and the core network may also be a wireless backhaul connection, e.g. a microwave or radio connection based connection.

The vBBU 110 may comprise a vCU 111 and a vDU 112. The vBBU 120 may comprise a vCU 121 and a vDU 122. The vCU 111 may communicate with the vDU 112 via an F1 interface therebetween. The vCU 121 may communicate with the vDU 122 via an F1 interface therebetween.

The vRAN 100 may further comprise remote radio units (RRUs) 130 and 140 which are located at cell sites at an edge of the vRAN 100. The vRAN 100 may further comprise a virtual Switch (vSwitch) 150. User data from each of the vBBUs 110 and 120 may be forwarded to one of the RRUs 130 and 140 via the vSwitch 150. User data from each of the RRUs 130 and 140 may be forwarded to one of the RRUs 130 and 140 via the vSwitch 150.

Each of the RRUs 130 and 140 may be connected to one of the vBBUs 110 and 120 via dedicated physical line connection such as a fiber optic cable or any other known or to be developed means for physically connecting each of the RRUs 130 and 140 and one of the vBBUs 110 and 120. The connection between each of the RRUs 130 and 140 and one of the vBBUs 110 and 120 may be referred to as a fronthaul connection.

Communications in the vRAN 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

The vCUs 111 and 121 may support user plane traffic with GTP-U based on IP stack for both S1-U interface and F1-U interface. The vDUs 112 and 122 supports more protocols than the vCUs 111 and 121. For example, the vDUs 112 and 122 may support user plane traffic with GTP-U based on IP stack for F1-U interface, eCPRI Protocol based on ether layer for fronthaul interface, and intra-container BIP based on ether layer for applications based on EM. Because the vDUs 112 and 122 supports more protocols than the vCUs 111 and 121, the conventional transport IO solution for the vCUs 111 and 121 cannot cover all cases of the vDUs 112 and 122.

Figure 2:
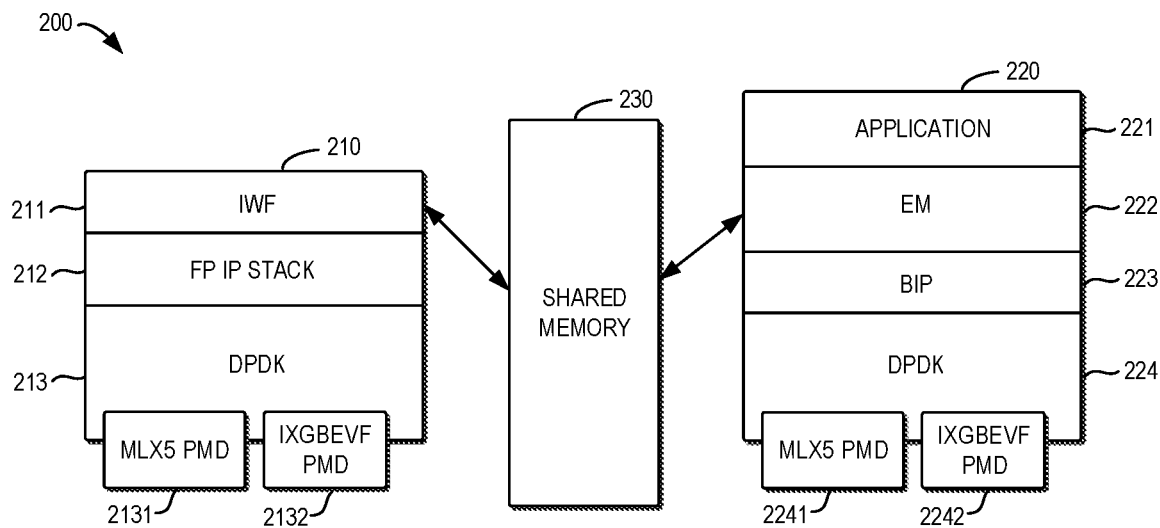
FIG. 2 illustrates a conventional transport IO framework.

FIG. 2 illustrates a conventional transport IO framework 200 for a vCU. As shown, the conventional transport IO framework 200 comprises a fast path (FP) transport IO module 210. The fast path transport IO module 210 comprises an interworking function (IWF) module 211, an FP IP stack 212 and a Data Plane Development Kit (DPDK) module 213. The DPDK module 213 comprises a plurality of Poll Mode Drivers (PMDs), such as MLX5 PMD 2131 and ixgbe_vf PMD 2132.

The conventional transport IO framework 200 may further comprise a user plane application 221, an EM module 222, a BIP module 223 and a DPDK module 224. The DPDK module 214 comprises a plurality of PMDs, such as MLX5 PMD 2241 and ixgbe_vf PMD 2142. It should be understood that the BIP module 223 is described just for example.

For traffic with IP stack, the fast path transport IO module 210 takes charge of IO function and process for packets based on IP stack, such as GTP-U for F1-U interface. The EM module 222 uses a shared memory 230 to exchange user plane data with the fast path transport IO module 210 and then passes the packets to the EM based user plane application 221. The exchange between the fast path transport IO module 210 and the EM module 222 increases latency and decreases throughput.

For traffic without IP stack, such as BIP, the EM module 222 takes charge of IO function and Ethernet protocol process. This makes the EM module 222 use totally different solutions for traffic with IP stack and without IP stack. This also makes the EM module 222 need to care which Ethernet protocol shall be supported. In addition, this makes the EM module 222 depend on the networking deployment, such as whether a virtual local area network (vLAN) is deployed.

In order to at least in part solve above and other potential problems, example embodiments of the present disclosure provide a data transport IO solution. In this solution, if it is determined that an ingress payload is associated with a plurality of services, the ingress payload will be converted into a group of events associated with the plurality of services. The group of events is provided to an ingress queue so as to be scheduled to the plurality of services. According to this solution, the events are directly provided to the ingress queue so that the events can be scheduled by an EM module to the plurality of services. The EM module does not need to use a shared memory to exchange user plane data with the fast path transport IO module. Thus, throughput and latency will be improved.

Figure 3:
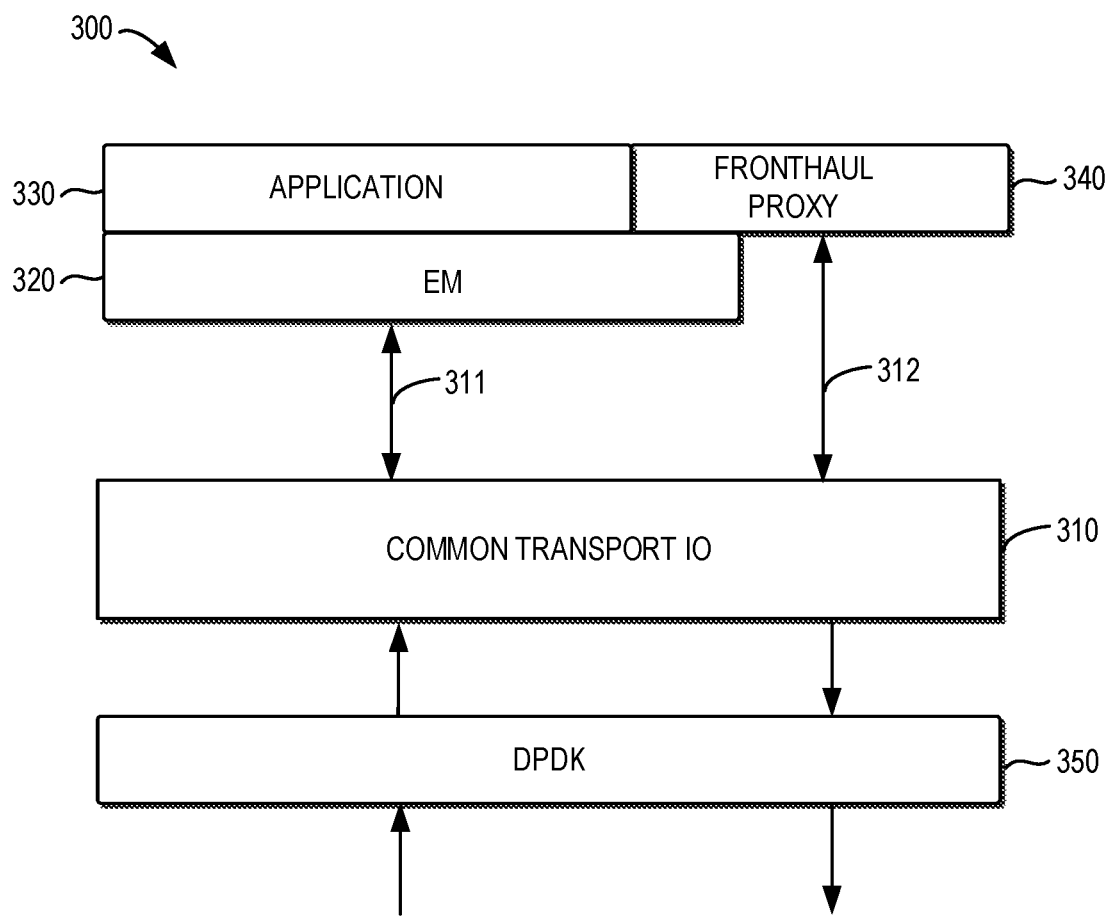
FIG. 3 illustrates a transport IO framework in accordance with some embodiments of the present disclosure.

Principle and implementations of the present disclosure will be described in detail below with reference to FIGS. 3 to 7. Reference is now made to FIG. 3, which illustrates a transport IO framework 300 in accordance with some embodiments of the present disclosure. The transport IO framework 300 may be implemented on any electronic device. The examples of the electronic device include, but are not limited to, the vCUs 111 and 121, and the vDUs 112 and 122.

As shown, the transport IO framework 300 may comprise a common transport IO module 310, an EM module 320, a user plane application 330, a fronthaul proxy 340 and a DPDK module 350. The user plane application 330 may provide a plurality of services. The fronthaul proxy 340 may provide a single service to the user plane application 330.

It should be understood that although the fronthaul proxy 340 is shown as an example module that provides a single service, the scope of the present disclosure is not limited thereto. The present disclosure may be used with any module that provides a single service.

The common transport IO module 310 identifies a first higher layer protocol for processing an Ethernet frame. In some embodiments, the DPDK module 350 may be configured to receive the Ethernet frame. For this purpose, in some embodiments, the DPDK module 350 may comprise a plurality of PMDs, such as ixgbe_vf PMD mlx5 PMD, i40e_vf PMD and BBDEV. In some embodiments, the DPDK module 350 may receive the Ethernet frame from any of the RRUs 130 and 140 via the backhaul connection therebetween. In other embodiments, the common transport IO module 310 may receive the Ethernet frame from a core network via the fronthaul connection therebetween.

In some embodiments, the Ethernet frame may comprises a type field, and a value in the type field may indicate a first higher layer protocol for processing the Ethernet frame. In such embodiments, the common transport IO module 310 may identify the first higher layer protocol based on the value in the type field.

The common transport IO module 310 extracts an ingress payload from the Ethernet frame based on the identified first higher layer protocol.

In some embodiments, the first higher layer protocol comprises one of the following: IP, BIP, Evolved Common Public Radio Interface (eCPRI) Protocol, or vLAN Protocol. For the purpose of extracting the ingress payload from the Ethernet frame, the common transport IO module 310 may comprises corresponding processing modules for a plurality of protocols, which will be described with reference to FIGS. 4 to 6.

Figure 4:
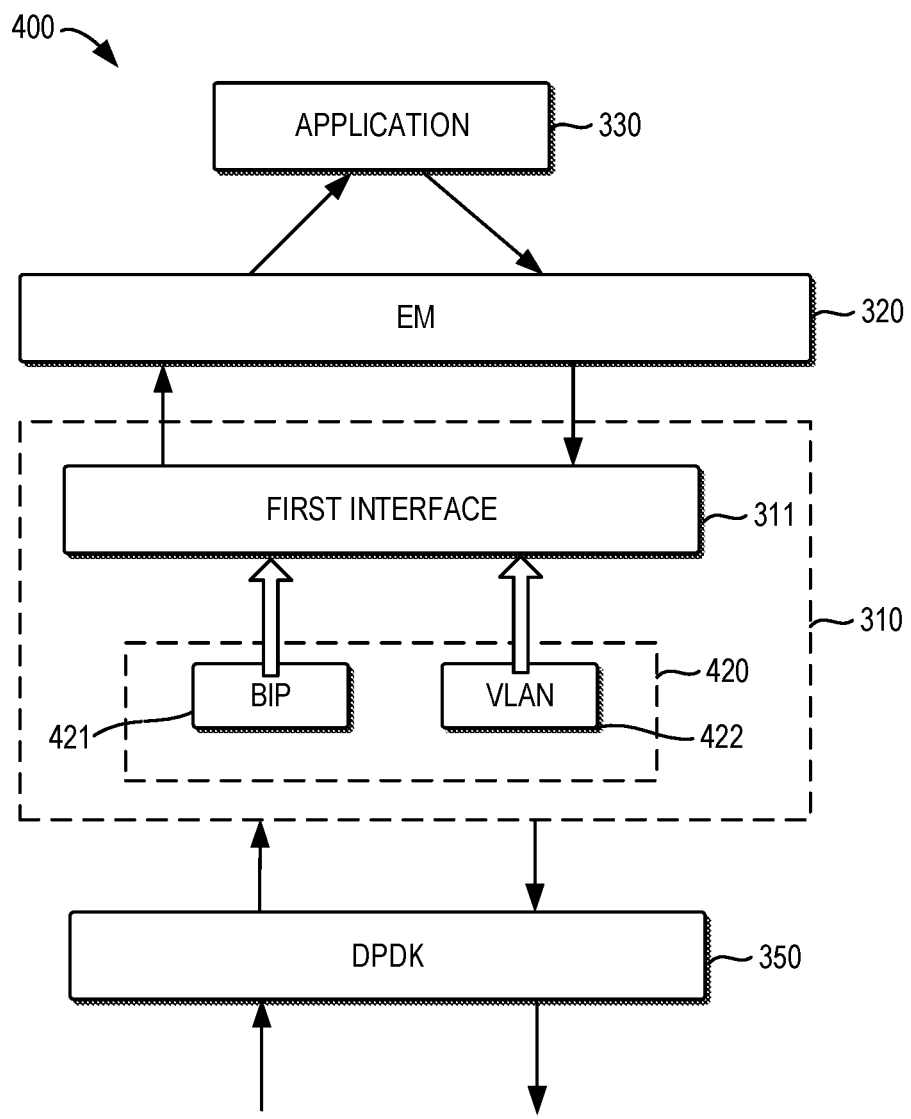
FIG. 4 illustrates an example implementation of the transport IO framework in accordance with some embodiments of the present disclosure.

FIG. 4 illustrates a transport IO framework 400 in accordance with some embodiments of the present disclosure. The transport IO framework 400 may be considered as an example implementation of the transport IO framework 300.

As shown, the common transport IO module 310 comprises a processing module 420 and the first interface 311.

The processing module 420 comprises a BIP processing module 421 and a vLAN processing module 422. In embodiments where the first higher layer protocol is BIP, the BIP processing module 421 may be configured to extract the ingress payload from the Ethernet frame. In embodiments where the first higher layer protocol is vLAN, the vLAN processing module 422 may be configured to extract the ingress payload from the Ethernet frame.

In some embodiments, each of the BIP processing module 421 and the vLAN processing module 422 may be implemented as a HOOK registered when the common transport IO module 310 starts up. Therefore, it is flexible to support other protocols in the future.

Figure 5:
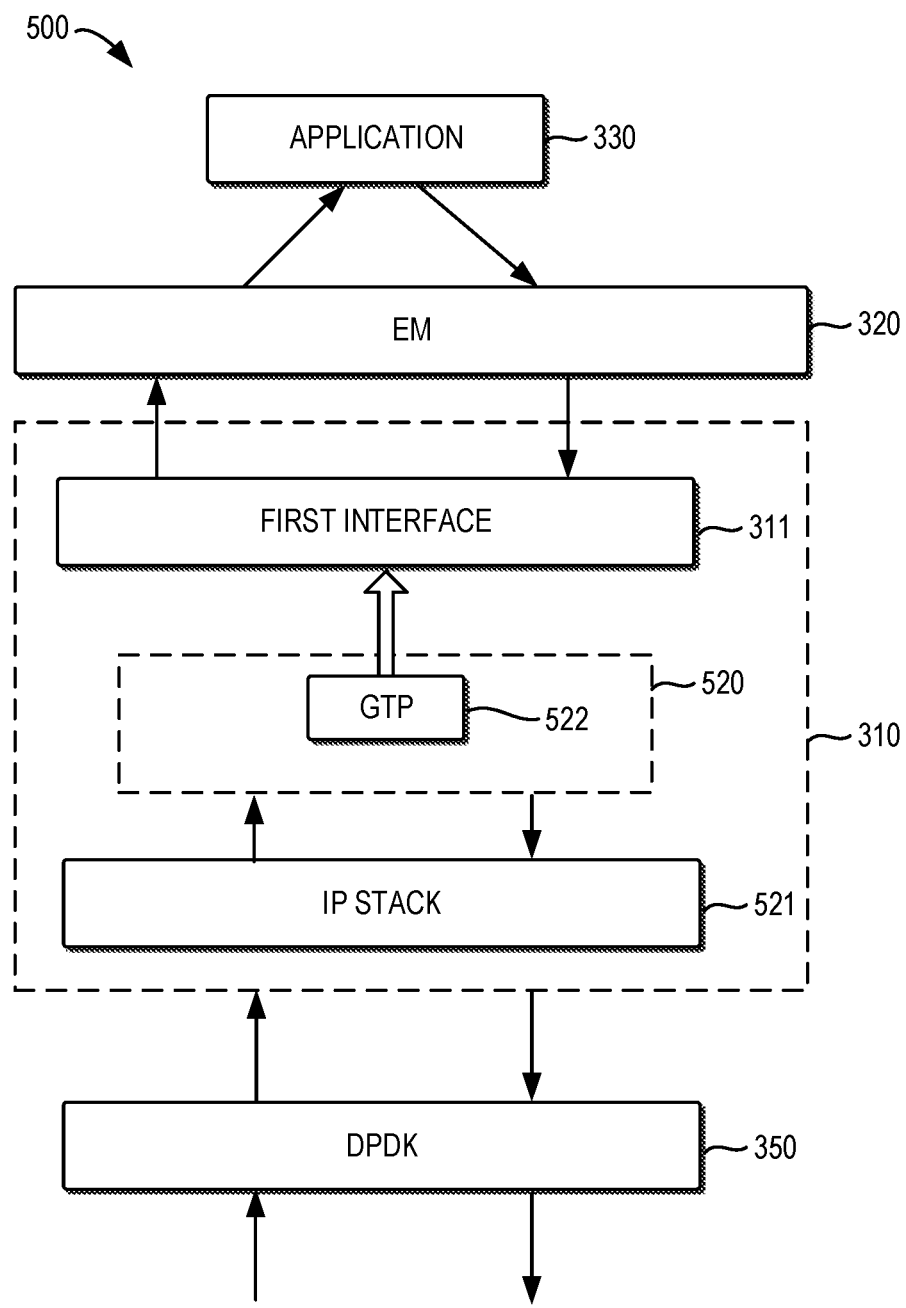
FIG. 5 illustrates another example implementation of the transport IO framework in accordance with some embodiments of the present disclosure.

FIG. 5 illustrates a transport IO framework 500 in accordance with some embodiments of the present disclosure. The transport IO framework 500 may be considered as another example implementation of the transport IO framework 300.

As shown, the common transport IO module 310 comprises a processing module 520 and the first interface 311.

The features of the DPDK module 350 in FIG. 5 are the same as the features of the DPDK module 350 in FIG. 3, and the features of the first interface 311 in FIG. 5 are the same as the features of the first interface 311 in FIG. 3. Thus, details of these modules are omitted for the purpose of conciseness.

The processing module 520 comprises an IP stack processing module 521 and a GTP processing module 522. In embodiments where the first higher layer protocol is GTP based on an IP stack, the IP stack processing module 521 and the GTP processing module 522 may be configured to extract the ingress payload from the Ethernet frame.

Similar to the BIP processing module 421 and the vLAN processing module 422, the GTP processing module 522 may be implemented as a HOOK registered when the common transport IO module 310 starts up.

Figure 6:
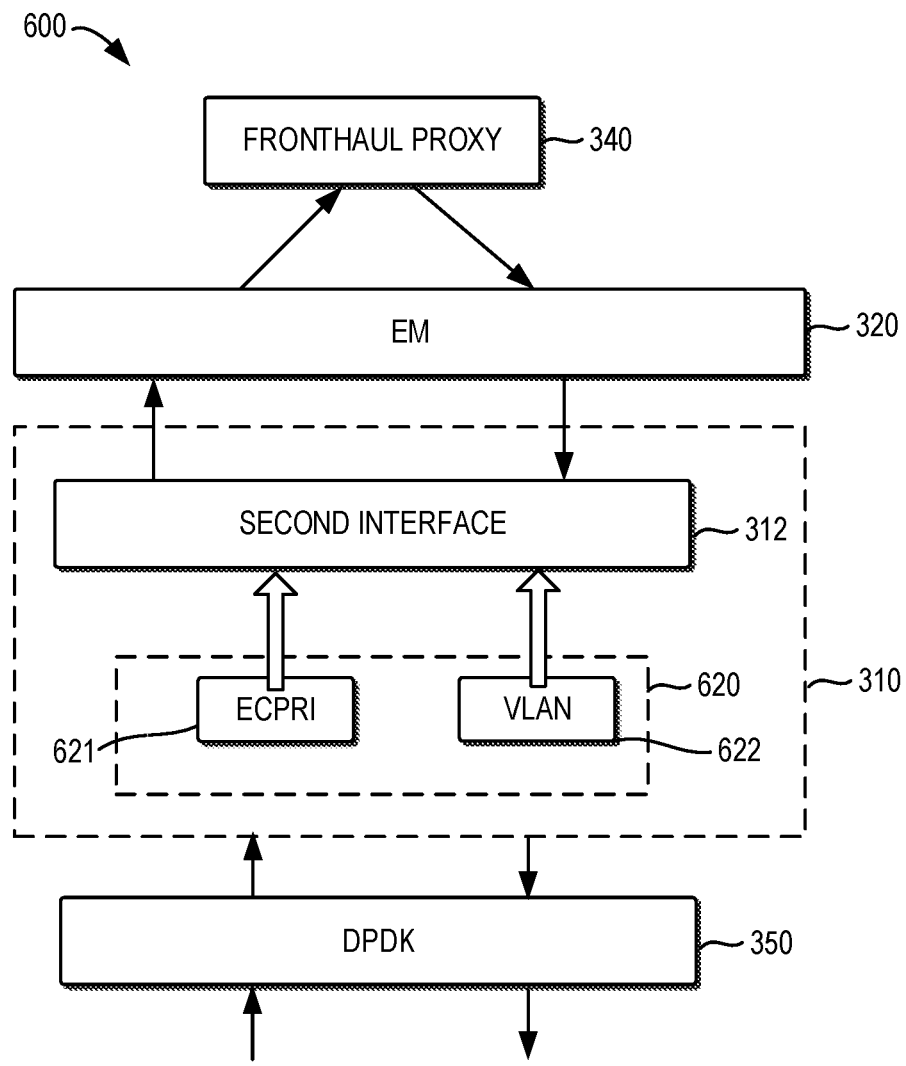
FIG. 6 illustrates yet another example implementation of the transport IO framework in accordance with some embodiments of the present disclosure.

FIG. 6 illustrates a transport IO framework 600 in accordance with some embodiments of the present disclosure. The transport IO framework 600 may be considered as yet another example implementation of the transport IO framework 300.

As shown, the common transport IO module 310 comprises a processing module 620 and the second interface 312.

The features of the DPDK module 350 in FIG. 6 are the same as the features of the DPDK module 350 in FIG. 3, and the features of the second interface 312 in FIG. 6 are the same as the features of the first interface 311 in FIG. 3. Thus, details of these modules are omitted for the purpose of conciseness.

The processing module 620 comprises an eCPRI processing module 621. In embodiments where the first higher layer protocol is eCPRI protocol, the eCPRI processing module 621 may be configured to extract the ingress payload from the Ethernet frame.

The processing module 620 further comprises a vLAN processing module 622. In embodiments where the first higher layer protocol is vLAN protocol, the vLAN processing module 622 may be configured to extract the ingress payload from the Ethernet frame.

In accordance with the embodiments of the present disclosure, the common transport IO module 310 takes charge of the IO function and processing of all packets, including packets both with IP stack and without IP stack, on F1-U, FH-U and also internal interfaces. Thus, the EM module 320 uses the same solution for all traffic and does not need to check whether it is IP based or not. In addition, the EM module 320 does not need to know the Ethernet protocol, and does not depend on networking deployment.

With continued reference to FIG. 3, the common transport IO module 310 determines whether the ingress payload is associated with the plurality of services or the single service. If it is determined that the ingress payload is associated with the plurality of services, the common transport IO module 310 converts the ingress payload into a first group of events associated with the plurality of services.

In turn, the common transport IO module 310 provides the first group of events to an ingress queue so that the first group of events can be scheduled by the EM module 320 to the plurality of services. In some embodiments, the common transport IO module 310 may provide the first group of events to the ingress queue via the first interface 311 between the common transport IO module 310 and the EM module 320.

On the other hand, if it is determined that the ingress payload is associated with the single service, the common transport IO module 310 provides the ingress payload to the single service. In some embodiments, the common transport IO module 310 may provide the ingress payload to the single service via the second interface 312 between the common transport IO module 310 and the fronthaul proxy 340. In such embodiments, the ingress payload will not be converted into the events and scheduled by the EM module 320. Instead, the ingress payload is provided to the single service directly. Thus, throughput and latency will be improved.

In some embodiments, when the application 330 uses the EM module 320 to send events (also referred to as a second group of events) with a non-local destination node ID, the common transport IO module 310 obtains the second group of events associated with a first egress payload from an egress queue. The egress queue is associated with a first destination of the first egress payload. In some embodiments, the egress queue may be associated with the non-local destination node ID.

The common transport IO module 310 converts the second group of events into the first egress payload, determines a second higher layer protocol for processing the first egress payload based on the first destination, and processes the first egress payload based on the second higher layer protocol for transmission to the first destination.

In embodiments where the second higher layer protocol is BIP, the BIP processing module 421 in FIG. 4 may be configured to process the first egress payload based on the BIP protocol. For example, the BIP processing module 421 may be configured to encapsulate the first egress payload into a BIP packet based on the BIP protocol. Then, the BIP packet may be sent via the DPDK module 350.

In embodiments where the second higher layer protocol is vLAN, the vLAN processing module 422 in FIG. 4 may be configured to process the first egress payload based on the vLAN protocol for transmission to the first destination.

In embodiments where the second higher layer protocol is GTP based on an IP stack, the IP stack processing module 521 and the GTP processing module 522 in FIG. 5 may be configured to process the first egress payload based on the GTP and IP protocols for transmission to the first destination.

In some embodiments, when the single service (for example, the fronthaul proxy 340) sends a second egress payload, the common transport IO module 310 obtains the second egress payload from the single service. The second egress payload indicates a second destination of the second egress payload. The common transport IO module 310 determines a third higher layer protocol for processing the second egress payload based on the second destination, and processes the second egress payload based on the third higher layer protocol for transmission to the second destination.

In embodiments where the third higher layer protocol is eCPRI, the eCPRI processing module 621 in FIG. 6 may be configured to process the second egress payload based on the third higher layer protocol for transmission to the second destination.

Figure 7:
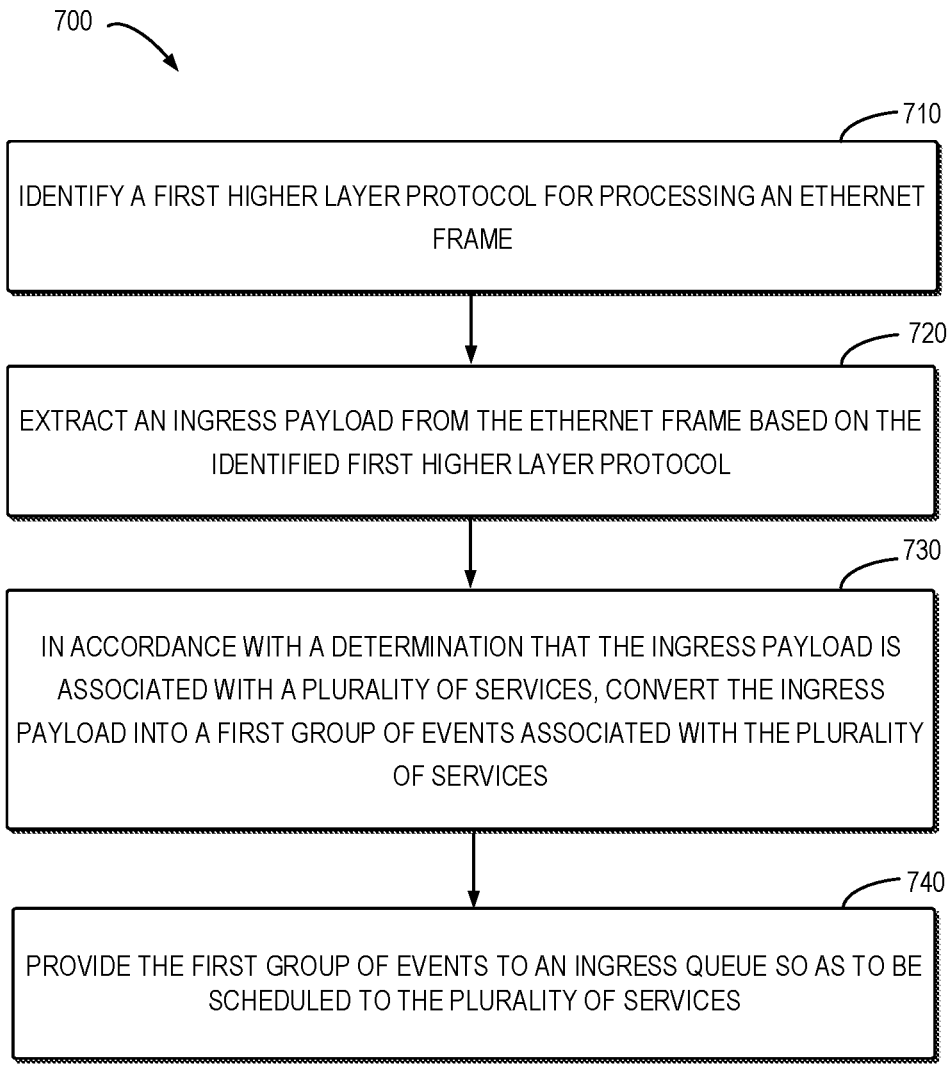
FIG. 7 illustrates a flowchart of a method implemented at an electronic device according to some example embodiments of the present disclosure.

FIG. 7 illustrates a flowchart of a method 700 implemented at an electronic device according to some example embodiments of the present disclosure. For the purpose of discussion, the method 700 will be described from the perspective of the common transport IO module 310 with reference to FIG. 3. It would be appreciated that the method 700 may also be implemented at any electronic device.

At block 710, the common transport IO module 310 identifies a first higher layer protocol for processing an Ethernet frame.

At block 720, the common transport IO module 310 extracts an ingress payload from the Ethernet frame based on the identified first higher layer protocol.

The common transport IO module 310 determines whether the ingress payload is associated with the plurality of services or the single service. If it is determined at block 730 that the ingress payload is associated with the plurality of services, the common transport IO module 310 converts the ingress payload into a first group of events associated with the plurality of services.

At block 740, the common transport IO module 310 provides the first group of events to an ingress queue so that the first group of events can be scheduled by the EM module 320 to the plurality of services.

In some embodiments, when the application 330 uses the EM module 320 to send a second group of events with a non-local destination node ID, the common transport IO module 310 obtains the second group of events associated with a first egress payload from an egress queue. The egress queue is associated with a first destination of the first egress payload. In some embodiments, the egress queue may be associated with the non-local destination node ID.

The common transport IO module 310 converts the second group of events into the first egress payload, determines a second higher layer protocol for processing the first egress payload based on the first destination, and processes the first egress payload based on the second higher layer protocol for transmission to the first destination.

In some embodiments, when the single service (for example, the fronthaul proxy 340) sends a second egress payload, the common transport IO module 310 obtains the second egress payload from the single service. The second egress payload indicates a second destination of the second egress payload. The common transport IO module 310 determines a third higher layer protocol for processing the second egress payload based on the second destination, and processes the second egress payload based on the third higher layer protocol for transmission to the second destination.

It shall be appreciated that descriptions of features with reference to FIGS. 1 and 3 to 6 also apply to the method 700, and have the same effects. Thus, the details of the features are omitted.

In some example embodiments, an apparatus capable of performing the method 700 (for example, the vCU 111, the vCU 121, the vDU 112 or the vDU 122) may comprise means for performing the respective steps of the method 700. The means may be implemented in any suitable form. For example, the means may be implemented in a circuitry or software module.

In some example embodiments, the apparatus comprises: means for identifying a first higher layer protocol for processing an Ethernet frame; means for extracting an ingress payload from the Ethernet frame based on the identified first higher layer protocol; in accordance with a determination that the ingress payload is associated with a plurality of services, means for converting the ingress payload into a first group of events associated with the plurality of services; and means for providing the first group of events to an ingress queue so as to be scheduled to the plurality of services.

In some example embodiments, the apparatus further comprises: in accordance with a determination that the ingress payload is associated with a single service, means for providing the ingress payload to the single service.

In some example embodiments, the apparatus further comprises: means for obtaining a second group of events associated with a first egress payload from an egress queue, the egress queue associated with a first destination of the first egress payload; means for converting the second group of events into the first egress payload; means for determining a second higher layer protocol for processing the first egress payload based on the first destination; and means for processing the first egress payload based on the second higher layer protocol for transmission to the first destination.

In some example embodiments, the apparatus further comprises: means for obtaining a second egress payload from the single service, the second egress payload indicating a second destination of the second egress payload; means for determining a third higher layer protocol for processing the second egress payload based on the second destination; and means for processing the second egress payload based on the third higher layer protocol for transmission to the second destination.

In some example embodiments, the plurality of services are provided by a user plane application running on the apparatus.

In some example embodiments, the single service is provided by a fronthaul proxy running on the apparatus.

In some example embodiments, the first higher layer protocol comprises one of the following: Internet Protocol, BTS Internal Protocol, Evolved Common Public Radio Interface Protocol, or Virtual Local Area Network Protocol.

Figure 8:
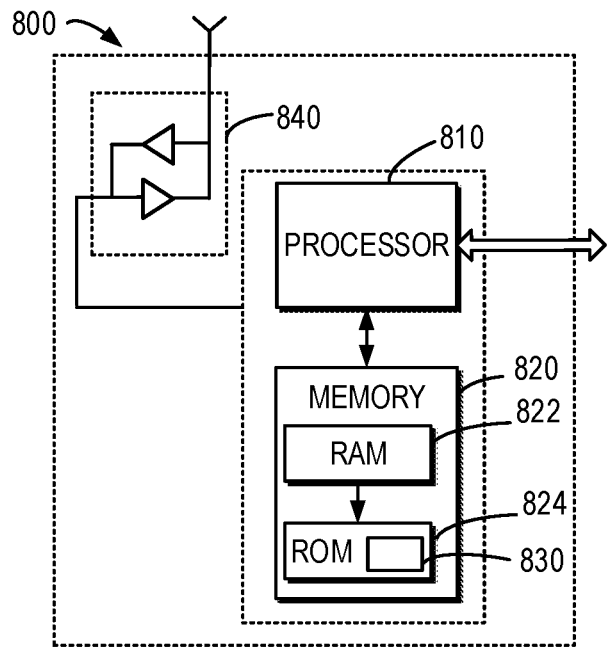
FIG. 8 illustrates a simplified block diagram of an apparatus that is suitable for implementing embodiments of the present disclosure.

FIG. 8 is a simplified block diagram of a device 800 that is suitable for implementing embodiments of the present disclosure. The device 800 may be provided to implement the electronic device, for example the vCU 111, the vCU 121, the vDU 112 or the vDU 122 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 3 to 7. The embodiments of the present disclosure may also be implemented by hardware or by a combination of software and hardware.

Figure 9:
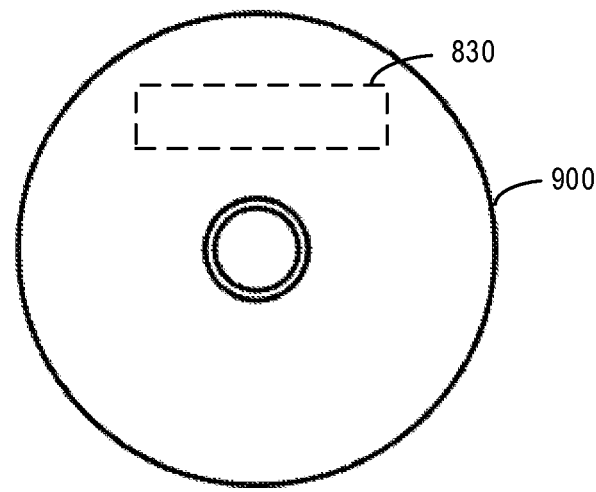
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 700 as described above with reference to FIG. 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An electronic device, comprising:
   at least one processor; and
   at least one memory including computer program code;
   the at least one memory and the computer program code configured to, with the at least one processor, cause the device to:
   identify a first higher layer protocol for processing an Ethernet frame;
   extract an ingress payload from the Ethernet frame based on the identified first higher layer protocol;
   in accordance with a determination that the ingress payload is associated with a plurality of services, convert the ingress payload into a first group of events associated with the plurality of services; and
   provide the first group of events to an ingress queue so as to be scheduled to the plurality of services.

2. The electronic device of claim 1, wherein the electronic device is further caused to:
   in accordance with a determination that the ingress payload is associated with a single service, provide the ingress payload to the single service.

3. The electronic device of claim 1, wherein the electronic device is further caused to:
   obtain a second group of events associated with a first egress payload from an egress queue, the egress queue associated with a first destination of the first egress payload;
   convert the second group of events into the first egress payload;
   determine a second higher layer protocol for processing the first egress payload based on the first destination; and
   process the first egress payload based on the second higher layer protocol for transmission to the first destination.

4. The electronic device of claim 1, wherein the electronic device is further caused to:
   obtain a second egress payload from the single service, the second egress payload indicating a second destination of the second egress payload;
   determine a third higher layer protocol for processing the second egress payload based on the second destination; and
   process the second egress payload based on the third higher layer protocol for transmission to the second destination.

5. The electronic device of claim 1, wherein the plurality of services are provided by a user plane application running on the electronic device.

6. The electronic device of claim 1, wherein the single service is provided by a fronthaul proxy running on the electronic device.

7. The electronic device of claim 1, wherein the first higher layer protocol comprises one of the following:
   Internet Protocol,
   BTS Internal Protocol,
   Evolved Common Public Radio Interface Protocol, or
   Virtual Local Area Network Protocol.

8. A method, comprising:
   identifying a first higher layer protocol for processing an Ethernet frame;
   extracting an ingress payload from the Ethernet frame based on the identified first higher layer protocol;
   in accordance with a determination that the ingress payload is associated with a plurality of services, converting the ingress payload into a first group of events associated with the plurality of services; and
   providing the first group of events to an ingress queue so as to be scheduled to the plurality of services.

9. The method of claim 8, further comprising:
   in accordance with a determination that the ingress payload is associated with a single service, providing the ingress payload to the single service.

10. The method of claim 8, further comprising:
    obtaining a second group of events associated with a first egress payload from an egress queue, the egress queue associated with a first destination of the first egress payload;
    converting the second group of events into the first egress payload;
    determining a second higher layer protocol for processing the first egress payload based on the first destination; and
    processing the first egress payload based on the second higher layer protocol for transmission to the first destination.

11. The method of claim 8, further comprising:
obtaining a second egress payload from the single service, the second egress payload indicating a second destination of the second egress payload;
determining a third higher layer protocol for processing the second egress payload based on the second destination; and
processing the second egress payload based on the third higher layer protocol for transmission to the second destination.

12. The method of claim 8, wherein the plurality of services are provided by a user plane application running on an electronic device.

13. The method of claim 8, wherein the single service is provided by a fronthaul proxy running on an electronic device.

14. The method of claim 8, wherein the first higher layer protocol comprises one of the following:
Internet Protocol,
BTS Internal Protocol,
Evolved Common Public Radio Interface Protocol, or
Virtual Local Area Network Protocol.

15. A non-transitory computer readable medium encoded with computer program code which, when executed on an apparatus, causes the apparatus to perform:
identifying a first higher layer protocol for processing an Ethernet frame;
extracting an ingress payload from the Ethernet frame based on the identified first higher layer protocol;
in accordance with a determination that the ingress payload is associated with a plurality of services, converting the ingress payload into a first group of events associated with the plurality of services; and
providing the first group of events to an ingress queue so as to be scheduled to the plurality of services.

16. The non-transitory computer-readable medium according to claim 15, wherein the computer program code further causes the apparatus to perform:
in accordance with a determination that the ingress payload is associated with a single service, providing the ingress payload to the single service.

17. The non-transitory computer-readable medium according to claim 15, wherein the computer program code further causes the apparatus to perform:
obtaining a second group of events associated with a first egress payload from an egress queue, the egress queue associated with a first destination of the first egress payload;
converting the second group of events into the first egress payload;
determining a second higher layer protocol for processing the first egress payload based on the first destination; and
processing the first egress payload based on the second higher layer protocol for transmission to the first destination.

18. The non-transitory computer-readable medium according to claim 15, wherein the computer program code further causes the apparatus to perform:
obtaining a second egress payload from the single service, the second egress payload indicating a second destination of the second egress payload;
determining a third higher layer protocol for processing the second egress payload based on the second destination; and
processing the second egress payload based on the third higher layer protocol for transmission to the second destination.

19. The non-transitory computer-readable medium according to claim 15, wherein the plurality of services are provided by a user plane application running on an electronic device.

20. The non-transitory computer-readable medium according to claim 15, wherein the single service is provided by a fronthaul proxy running on an electronic device.

* * * * *